United States Patent
Hu et al.

(10) Patent No.: US 7,505,632 B2
(45) Date of Patent: Mar. 17, 2009

(54) METHOD, APPARATUS AND STORAGE MEDIUM FOR ENHANCING DOCUMENT IMAGE, METHOD, APPARATUS AND STORAGE MEDIUM FOR CHARACTER RECOGNITION

(75) Inventors: Ou Hu, Beijing (CN); Xian Li, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 810 days.

(21) Appl. No.: 10/986,378

(22) Filed: Nov. 12, 2004

(65) Prior Publication Data

US 2005/0180660 A1 Aug. 18, 2005

(30) Foreign Application Priority Data

Nov. 28, 2003 (CN) .................... 2003 1 0118684

(51) Int. Cl.
| | |
|---|---|
| G06K 9/34 | (2006.01) |
| G06K 9/46 | (2006.01) |
| G06K 9/62 | (2006.01) |
| G06K 9/42 | (2006.01) |
| G06K 9/44 | (2006.01) |
| G06K 9/40 | (2006.01) |
| G06K 1/00 | (2006.01) |
| G06F 3/12 | (2006.01) |
| G06F 15/00 | (2006.01) |
| H04N 1/60 | (2006.01) |

(52) U.S. Cl. .................. 382/275; 382/176; 382/177; 382/180; 382/190; 382/224; 382/256; 382/261; 382/266; 358/1.1; 358/1.9

(58) Field of Classification Search ................. 382/173, 382/176, 180–186, 197, 224–225, 242, 266, 382/321–324, 256–258; 358/1.1, 1.9
See application file for complete search history.

(56) References Cited

U.S. PATENT DOCUMENTS

| | | | | | |
|---|---|---|---|---|---|
| 4,891,750 | A | * | 1/1990 | Pastor et al. | 382/197 |
| 5,142,689 | A | * | 8/1992 | Eisenack | 710/107 |
| 5,438,628 | A | * | 8/1995 | Spitz et al. | 382/181 |

(Continued)

OTHER PUBLICATIONS

Wang et. al., "An Automatic Chip Character Checking System for Circuit Board Quality Control", The 29th Annual Conference of the IEEE Industrial Electronics Society 2003, vol. 2 pp. 1767-1770, IEEE Nov. 2-6, 2003.*

(Continued)

*Primary Examiner*—Matthew C Bella
*Assistant Examiner*—Nathan Bloom
(74) *Attorney, Agent, or Firm*—Fitzpatrick, Cella, Harper & Scinto

(57) ABSTRACT

The present invention relates to method, apparatus and storage medium for enhancing document image, and method, apparatus and storage medium for character recognition. For enhancing the document image especially half-tone block image and improving the recognition ratio thereof, the block image is segmented into line images, which are subject to noise reduction. Then, based on the connected component densities, the noise-reduced line images are sorted into three types including normal line image, broken-stroke line image and hollow-stroke line image. Based on their types and other properties, the noise-reduced line images are enhanced, generating enhanced line images, which as a whole constitutes an enhanced block image.

28 Claims, 12 Drawing Sheets

U.S. PATENT DOCUMENTS

| | | | | |
|---|---|---|---|---|
| 5,809,167 | A | * | 9/1998 | Al-Hussein ................. 382/190 |
| 5,848,186 | A | * | 12/1998 | Wang et al. ................. 382/176 |
| 6,314,196 | B1 | * | 11/2001 | Yamaguchi et al. ......... 382/125 |
| 6,400,845 | B1 | * | 6/2002 | Volino ........................ 382/176 |
| 7,362,901 | B2 | * | 4/2008 | Walch ........................ 382/199 |

OTHER PUBLICATIONS

Gregory Baxes, "Digital Image Processing—Priniciple and Applications", John Wiley & Sons, Inc., 1994, pp. 98-99 and 129-135.*

* cited by examiner

采用英特尔® 奔腾® 4处理器1.3GHz。
钟频率，还大幅度提高了多媒体编解码

Fig. 8B

，采用英特尔® 奔腾® 4处理器1.3GHz。
钟频率，还大幅度提高了多媒体编解码

Fig. 9B
提起杨柳，很多人首先会想到播《新闻联播》
目秀的小伙子。有段时间，熟悉他的观众突然找?
后来，喜欢《环球》的人在这档节目中又见文质彬
Fig. 10A
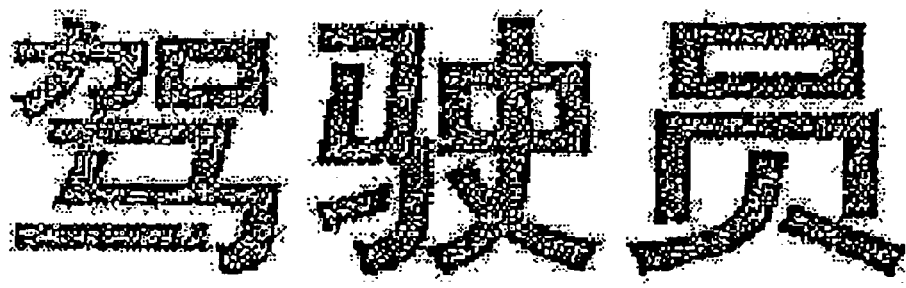
Fig. 10B

METHOD, APPARATUS AND STORAGE MEDIUM FOR ENHANCING DOCUMENT IMAGE, METHOD, APPARATUS AND STORAGE MEDIUM FOR CHARACTER RECOGNITION

CROSS-REFERENCE TO RELATED APPLICATIONS

This application claims priority from Chinese Patent Application No.200310118684.7 filed on Nov. 28, 2003, which is incorporated hereby by reference.

BACKGROUND OF THE INVENTION

1. Field of the Invention

The present invention relates to a method, an apparatus and a storage medium for enhancing document image, and a method, an apparatus and a storage medium for character recognition using the same.

2. Related Art

OCR is a well-known technique in recognizing either hand-written characters or scanned characters.

As shown in FIG. 1, to implement character recognition of a document image 102, a step of block segmentation 104 is carried out to separate the smallest region containing all the characters from the whole binary document image 102. In other words, the step of block segmentation 104 is to remove the margin of the document image 102. The resultant block image, which generally is a rectangle region, is further processed by a step of line segmentation 108, so that each character line in form of line image is extracted. Then each line image is subjected to a step of character segmentation 112 and character images corresponding to each character to be recognized are extracted. The last step is a step of single-character recognizing 116 based on each character image, and the recognition result 118 is output to, for example, a text processing application or the like.

When recognizing scanned document image, if the image quality is high, the recognition result of current OCR products is satisfying. However, if the quality of the document image is not so perfect or even is very bad, then the recognition ratio will sharply decrease.

For example, conventional OCR engine could not recognize color or gray-scale image very well. This is because OCR is based on binary image recognition. For purpose of scanning, storing and recognizing color or gray scale image original in the format of binary image, half-tone image technique has been developed. In a half-tone image, one "pixel" is comprised of a small binary image so that different colors or grays could be simulated. The so-called "pixel" actually includes an array of binary pixels and corresponds to a small area having a certain color or gray level in the original. For that reason, compared to normal binary document image, or compared to the original, the quality of a half-tone document image is much lower.

That is to say, conventional OCR engine could not recognize color or gray-scale image very well because it could not recognize half-tone image very well. The specific reasons are as follow.

When the original has a background having a certain color or gray level, then in the half-tone document image to be recognized, there are many background noises caused by said color or gray level, as shown in FIG. 2.

As to the characters, if they are not black in the original, then in the strokes of the character in the half-tone document image, the corresponding pixels will not be all in black, but some white pixels will appear. Then the strokes will look like broken (as shown in FIG. 3), hollowed (as shown in FIG. 4) or having zigzag contours (as shown in FIG. 5) under different conditions.

Obviously, the broken strokes, hollowed strokes and zigzag strokes will strongly distort the extracted features of character images. Conventional OCR algorithm cannot distinguish the different defects as described above of half-tone document images and cannot make the corresponding restoration, consequently the recognition ratio is very low.

The noise will also greatly affect the block segmentation, line segmentation, character segmentation and single-character recognizing. If noise reduction is carried out, then the phenomena of broken strokes, hollowed strokes and zigzag strokes will be much severer. Under such conditions, conventional OCR algorithm even cannot make right line segmentation. This is because conventional OCR algorithm is directed to normal document image, which has much less noises, so the noise reduction carried in conventional OCR algorithm is very soft. Even for normal document image, if strong noise reduction is carried out, the strokes will be affected and the recognition ratio will decrease.

In addition, there are other applications, such as copying apparatus, needing enhancing document images such as obtained from non-white-and-black originals.

SUMMARY OF THE INVENTION

Therefore, the object of the invention is to provide a new technique capable of enhancing a half-tone document image and "restore" it to a state of normal document image.

A further object of the invention is to improve the recognition ratio of the document image, especially when the document image is half-tone image.

For achieving the first object, the basic idea of the invention is to identify different defects existing in the image and "remove" them with corresponding algorithm. In other words, the basic idea is to sort the document images into different types, then enhance them with corresponding algorithm.

In most cases, the characters in a same line will have the same size and font, and their images usually have the same properties. So, we presumed that all characters in a same line have the same properties. Based on this presumption, we can determine the properties of line images instead of the properties of individual character images, and we can make corresponding restoration on the whole line image instead of every character images individually.

Specifically, as one aspect of the invention, a document image enhancing method is provided, which comprising steps of: labeling the connected components in an image; sorting the image into three types including normal line image, broken-stroke line image and hollow-stroke line image, based on the labeling result; and enhancing the image according to the sorted type.

As another aspect of the invention, a document image enhancing method is provided, which comprises steps of: reducing noises in an original block image, resulting in a noise-reduced block image; segmenting the noise-reduced block image and obtaining position information of line images; pre-analyzing the line images and the inter-line images in the original block image, obtaining properties of the line images and the inter-line images; reducing noises in the line images in the original block image based upon said properties, resulting in noise-reduced line images; labeling the connected components in the noise-reduced line images and obtaining the numbers of different connected components in the noise reduced line images; sorting the noise-reduced line images into three types including normal line image, broken-stroke line image and hollow-stroke line image; enhancing the noise-reduced line images based on their types and said properties, obtaining enhanced line images, which as a whole, along with the inter-line images obtained in the step of reducing noises in the original block image, constitutes an enhanced block image.

Applying the above enhancing methods in conventional OCR method, specifically, after the block segmentation 104 (FIG. 1) and before the line segmentation 108 (FIG. 1) may result in higher recognition ratio of half-tone document image. In fact, if using the enhancing methods, the line segmentation 108 may also be omitted because the line segmentation has been completed during the block image enhancement.

Alternatively, the block segmentation may be integrated into the invention so that the invention may be applied on original documents directly obtained by scanning.

For achieving said object, the invention also provides a document image enhancing apparatus comprising: storage means for storing the original block image to be enhanced, intermediate and final images, and other intermediate results; a first noise filter for reducing noises in the original block image, resulting in a noise-reduced block image; a line segmenting means for segmenting the noise-reduced block image and generating position information of line images; a pre-analyzer for pre-analyzing the line images and the inter-line images in the original block image, generating properties of the line images and the inter-line images; a second noise filter for reducing noises in the line images in the original block image based upon said properties, resulting in noise-reduced line images; a labeling means configured to label connected components in an image and generate densities of different connected components in the image, and used to label the noise-reduced line image obtained from the second noise filter and other intermediate line images; a sorting means for sorting the noise-reduced line images into three types including normal line image, broken-stroke line image and hollow-stroke line image; a normal line image enhancer configured to enhance the normal line image, based on above-said properties, through smoothing the line image; a hollow-stroke line image enhancer configured for enhancing the hollow stroke line image, based on said properties, through filling the hollow areas in the strokes in the line image; a broken-stroke line image enhancer configured for enhancing the broken-stroke line image, based on said properties, through connecting the broken-stroke in the line image; and a controller controlling the operations of above components and ensuring that each line image is processed.

The invention further provides a character recognition apparatus comprising above-said document image enhancing apparatus, character segmenting means for segment the line images in to single-character images, and single-character recognizing means for recognizing each single-character images.

Storage medium is also provided, in which program codes for implementing any of said character recognition methods have been stored.

Making use of the present invention, document images, including half-tone images, may be enhanced and the recognition ratio thereof may be improved.

BRIEF DESCRIPTION OF THE DRAWINGS

Other objects, features and advantages of the invention will become more apparent after reading the following detailed description of the preferred embodiments. The accompanying drawings, which are incorporated in and constitute a part of the specification, illustrate embodiments of the invention and, together with the description, serve to explain the principles of the invention. In the drawings:

FIG. 8A and FIG. 8B are views showing a document image sample having many noises before and after being processed by the invention;

FIG. 9A and FIG. 9B are views showing a document image sample containing broken strokes before and after being processed by the invention;

FIG. 10A and FIG. 10B are views showing a document image sample containing hollow strokes before and after being processed by the invention;

FIG. 11A and FIG. 11B are views showing a document image sample containing zigzag strokes before and after being processed by the invention;

DESCRIPTION OF THE PREFERRED EMBODIMENTS

Preferred embodiments of the present invention will now be described with reference to the accompanying drawings.

Example of Computer System

The method of the invention may be implemented in any information processing equipment, for example, a personal computer (PC), a notebook, or a single-chip microcomputer (SCM) embedded in any automation equipment such as postal matters sorting equipment. To a person skilled in the art, it would be easy to realize the method of the invention through software, hardware and/or firmware. It should be particularly noted that, to implement any step of the method or any combination of the steps, it is obvious to a person skilled in the art that it may be necessary to use I/O device, memory device, microprocessor such as CPU, and the like. The following descriptions of the method of the invention will not necessarily mention such devices, although they are actually used.

Figure 1:
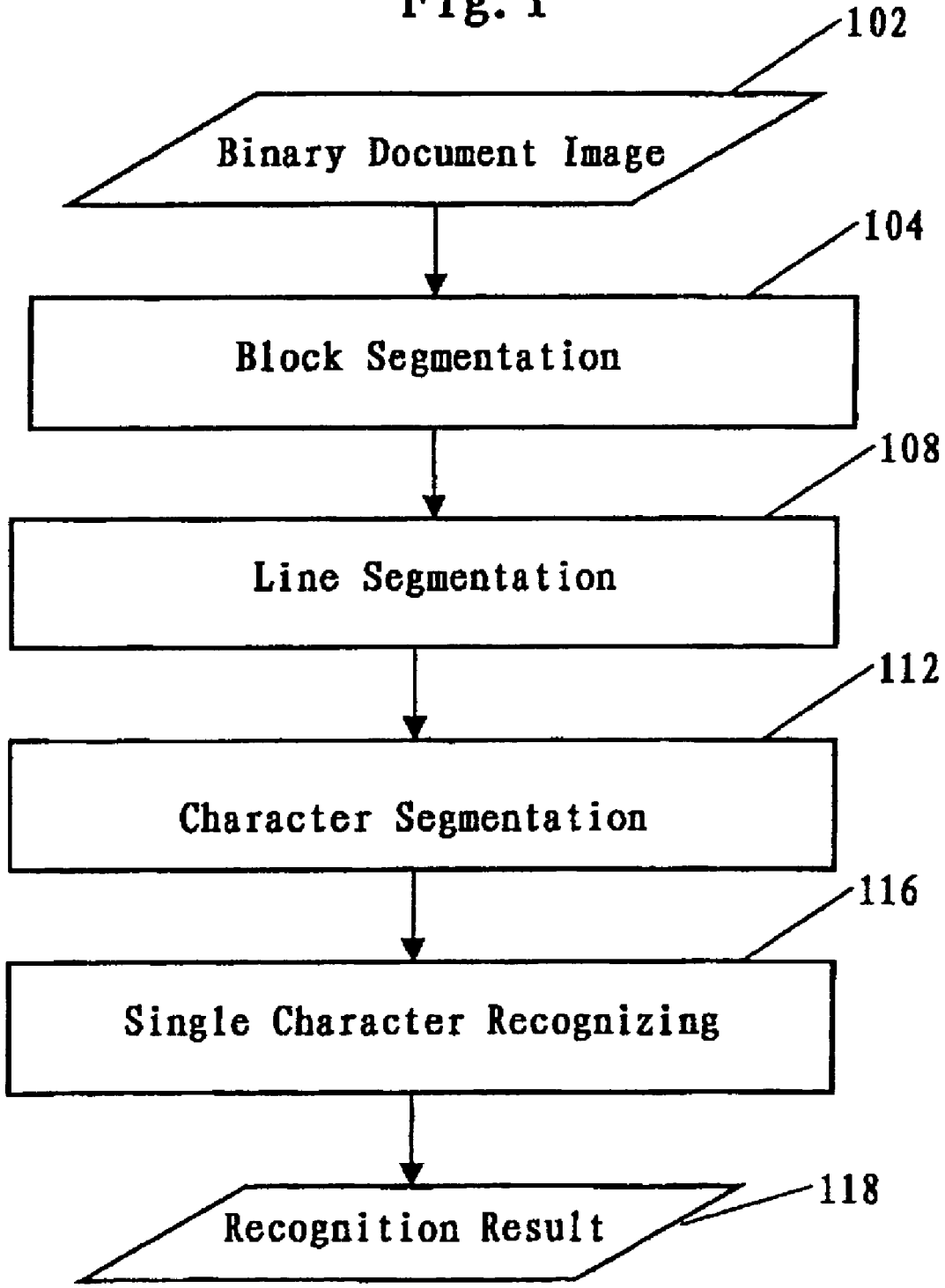
FIG. 1 is a flow chart of an OCR method in the prior art.
Figures 2, 3:
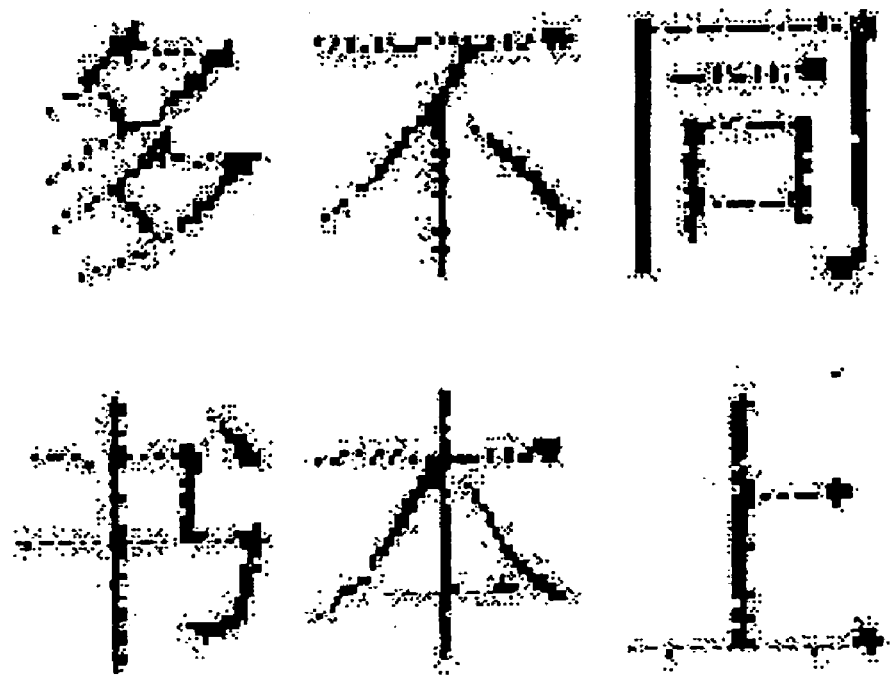
FIG. 2 is an example of a half-tone image having many noises.
FIG. 3 is an example of a half-tone image containing broken strokes.
Figure 4:
FIG. 4 is an example of a half-tone image containing hollow strokes.
Figure 5:
FIG. 5 is an example of a half-tone image containing zigzag strokes.
Figure 6:
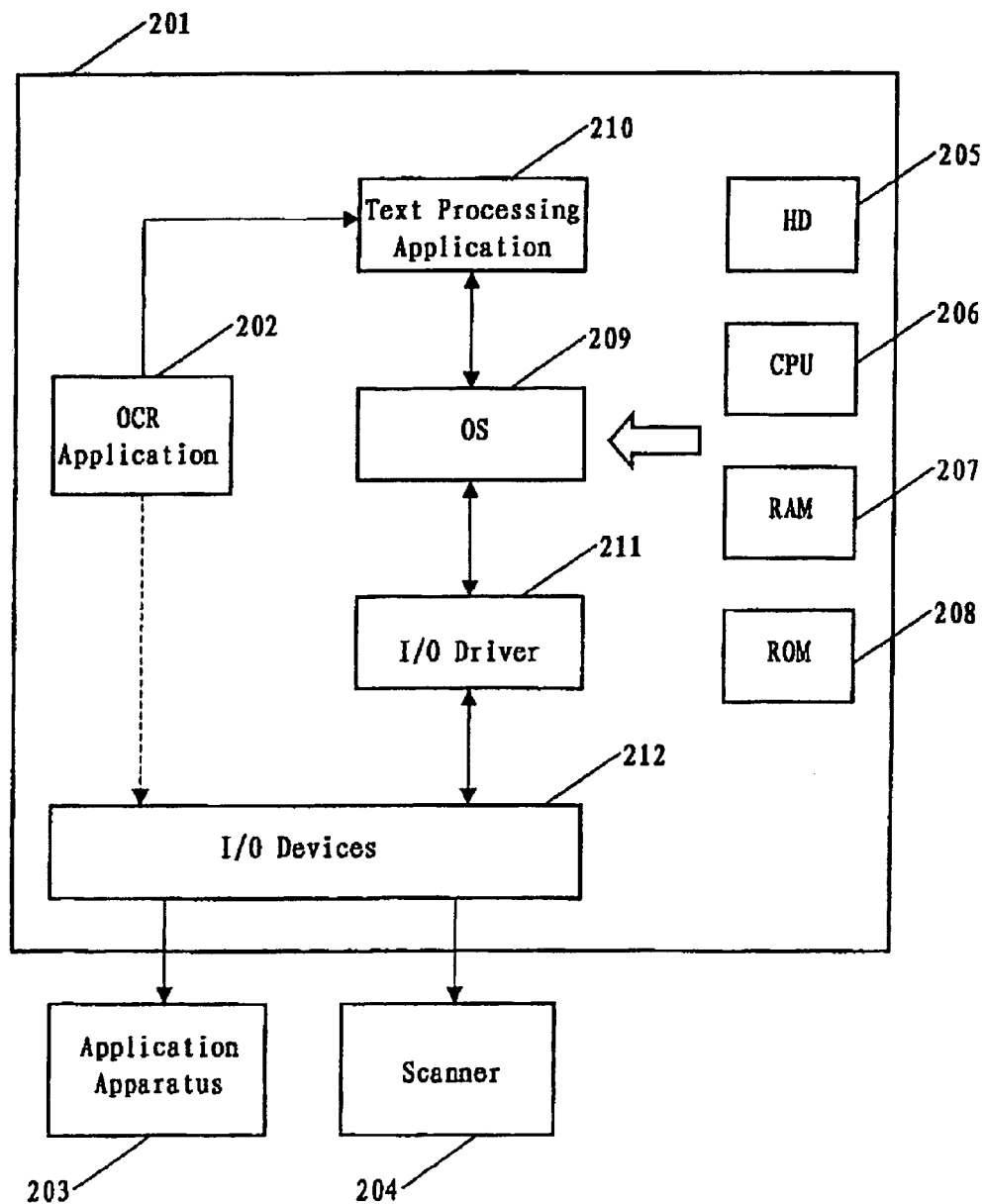
FIG. 6 is a block diagram of an information processing system in which the present invention may be implemented.

As the information processing equipment mentioned above, the block diagram illustrated in FIG. 6 shows an example of a computer system in which the method and apparatus of the invention may be implemented. Note that the computer system shown in FIG. 6 is just explanatory and does not intend to limit the scope of the invention.

From the viewpoint of hardware, a computer 201 comprises a CPU 206, a hard disk (HD) 205, a RAM 207, a ROM 208 and I/O devices 212. The I/O devices may include input means such as keyboard, touch pad, trackball and mouse and etc., output means such as printer and monitor, and input/output means such as floppy disk drive, optical disk drive and communication ports.

From the viewpoint of software, the computer comprises substantially operation system (OS) 209, I/O drivers 211 and various applications. As operating system, any commercially available OS may be used, such as Windows series or Linux-based OS. The I/O drivers are for driving respectively said I/O devices. The applications may be any kind of applications such as text processing application 210, image processing application and the like, and includes any existing applications that can be used in or can use the present invention and applications programmed for the present invention, which call or is to be called by said existing applications (such as OCR application 202).

Thus, in the present invention, the method may be implemented by the OS, the applications and I/O drivers in the hardware of the computer.

Further, the computer 201 may be connected to an image source such as a scanner 204 to obtain images to be recognized. The results obtained by the OCR using the invention may be output to any application apparatus 203, which, on the basis of said results, executes proper operations. The application apparatus may be any automatic control system, such as postal matter sorting equipment. The application apparatus may also be embodied as another application (in combination with hardware) implemented within the computer 201 and for further processing the image; for example, it may be a text processing application such as Microsoft Word (Microsoft is a trademark owned by Microsoft Corporation), for editing the recognized text.

Document Image Enhancing Method (Preferred Embodiment)

Figure 7A:
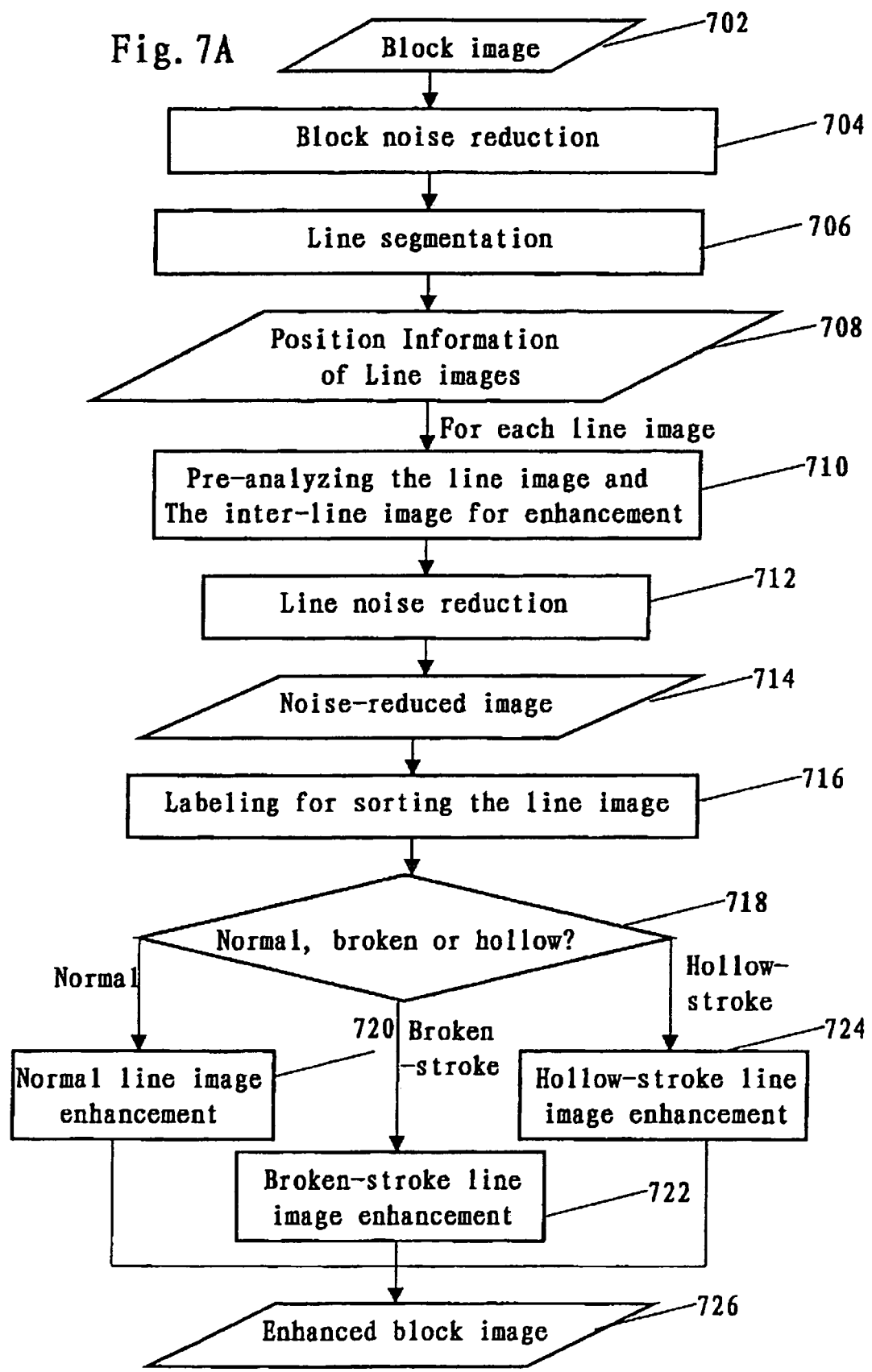
FIG. 7A is a flow chart of a preferred embodiment of a document image enhancing method according to the invention.

FIG. 7A shows a preferred embodiment of the inventive document image enhancing method.

The method begins with a block image 702, which is obtained from other applications, such as an OCR application or a scanner and etc. Needless to say, the block image 702 is stored somewhere and needs to be read out when to be processed. It also should be noted, and it is obvious to a person skilled in the art that, when an image is processed, the original image and the intermediate processing results should be stored so that they will not be destroyed and could be used in subsequent processing steps that need the original image or certain intermediate results. However, for sake of clarity and conciseness, such steps as copying or storing for above purposes are omitted in the following description and the drawings.

The first step is block noise reduction 704 carried out on the block image 702. The purpose of this step is to improve the quality of the block image so that in the next step of line segmentation 706 the block image 702 could be segmented into line images correctly. In this step, any noise filter may be adopted, including those used in or before the line segmentation step in the prior art character recognition (OCR) method or apparatus, such as median filter or mean filter using different templates. Considering the characteristics of the background noise in half-tone image, median filter using 3×3 template is preferable.

Then, based on noise-reduced block image, line segmentation 706 is carried out, generating position information 708 of line images. According to the position information 708, the subsequent steps may process the original block image by line. In other words, when we say a "line image" is processed, it is actually an area in the block image defined by the corresponding position information that is processed.

After line segmentation 706, enhancing operations will be carried out on each line image. Please note that as known by any person skilled in the art, when a plurality of objects are to be processed similarly, the algorithm may be in a series manner (i.e., through looping) or in a parallel manner, or otherwise in a hybrid manner, that is, some steps are looped for different objects while the other are executed parallelly for different objects. So, in the following, only the processing for one line will be described in details.

First we pre-analyze the line image and the corresponding inter-line images to obtain some properties that will be used in the subsequent steps. However, please note that to a person skilled in the art, it is obvious that this pre-analyzing step may be distributed into subsequent steps. That is, the necessary properties of the line image and the inter-line images may be calculated in concerned subsequent steps needing them, rather than be calculated in advance.

(Pre-analyzing of Line Image)

The pre-analyzing includes four aspects:

A. Calculating Character Number in the Line Image (Hereinafter Referred to as Character Number).

Character number will be used in subsequent labeling step or re-labeling step for generating connected component density.

Character number may be calculated using the following formula:

For horizontal line: character number=K×line width/line height

For vertical line: character number=K×line height/line width

K is a coefficient reflecting the classification of language. For example, for pictograph characters such as of Chinese and Japanese, the value of K may be 1. For alphabetic letters such as of English, the value of K will be greater than 1.

B. Labeling Connected Components and Calculating Connected Component Density.

In the present invention, we label black 8 connected components, black 4 connected components, white 8 connected components and white 4 connected components in the line image, thus obtain black 8 connected component density (hereinafter referred to as B8), black 4 connected component density (hereinafter referred to as B4), white 8 connected component density (hereinafter referred to as W8), and white 4 connected component density (hereinafter referred to as W4) in the line image. Each connected component density is calculated using the following formula:

Connected component density=number of connected components/character number

Please note that for subsequent line noise reducing step 712 as will be described below, the inventors propose various embodiments, among which some will not use certain connected component density(ies) as described above. If this is the case, then obviously, said certain connected component density(ies) need not be calculated in this step and the corresponding connected component(s) need not be labeled. If the line noise-reducing step 712 does not use connected component density(ies), then this step may be cancelled.

The concept of connected component will be explained as follows. For example, a black 8 connected component is a connected component that is 8-connectivity. The "black" means we count the black pixels for the connected component.

That's to say, a "black 8 connected component" is a block of black pixels that is in 8-connectivity.

The notation "pixel connectivity" describes a relation between two or more pixels. For two pixels to be connected, they have to fulfill certain conditions on the pixel brightness and spatial adjacency.

First, in order for two pixels to be considered connected, their pixel values must both be from the same set of values V. For a grayscale image, V might be any range of gray levels, e.g. V={22, 23, . . . 40}. For a binary image we simple have V={1}.

To formulate the adjacency criterion for connectivity, we first introduce the notation of neighborhood. For a pixel p with the coordinates (x,y), the set of pixels given by:

$$N4(p)=\{(x+1,y),(x-1,y),(x,y+1),(x,y-1)\}$$

is called its 4-neighbors. Its 8-neighbours are defined as $$N8(p)=N4(p) \cup \{(x+1,y+1),(x+1,y-1),(x-1,y+1),(x-1,y-1)\}$$

From this we can infer the definition for 4- and 8-connectivity: Two pixels p and q, both having values from a set V, are 4-connected if q is from the set N4(p) and 8-connected if q is from N8(p).

C. Counting the Number of Black Pixels in the Line Image and Calculating the Black Pixel Density in the Line Image (Hereinafter Referred to as Black Pixel Density).

Black pixel density=number of black pixels in the line image/(line width×line height)

Here the line width and line height are measured in pixels.

Please note that for subsequent line noise reducing step 712 and line enhancing steps after sorting step 718 as will be described below, the inventors propose various embodiments, among which some will not use black pixel density. If this is the case, then obviously this step is unnecessary.

D. Counting the Number of Inter-Line Noises and Calculating the Inter-Line Noise Density.

Any region between two adjacent line images is referred to as an inter-line image. In most cases, the noise distributions in the line image and in the inter-line image are similar; therefore, the noise density in the inter-line image will reflect the intensity of noises in the line images.

When counting the number of noises in an inter-line image (number of inter-line noises) and calculating the density of the inter-line noises (inter-line noise density), we may consider the entire area of each inter-line image or only a portion of said entire area. Furthermore, we may take into account only one inter-line image adjacent to a concerned line image, said one inter-line image may be that above the concerned line image or below the concerned line image; but we also may take both inter-line images above and below the concerned line image into account.

In a preferred embodiment, inter-line noise density equals to the number of noises in two regions respectively selected from the inter-line images above and below a concerned line image divided by the area in pixels of said two regions.

In a further preferred embodiment, the two regions are adjacent to the concerned line image and have respectively a width identical with that of the line image and a height equivalent to ⅟₁₀ of that of the line image. For vertical lines, similarly, said two regions will be respectively on the right and left sides of a concerned line image.

After pre-analyzing, we may begin to enhance the line image. The first enhancing step is a line noise-reducing step 712, in which the noises in the line image are reduced and a noise-reduced line image 714 is generated.

In the line noise reducing step 712, as well as in the step of normal line image enhancement 720, the step of broken-stroke line image enhancement 722 and the step of hollow-stroke line image enhancement 724 as will be described below, various image enhancing techniques may be adopted, including removing single pixels, median filter, smoothing, soft dilation and strong dilation.

The operation of removing single pixels is to remove discrete single black pixels in the line image, and is a common algorithm known by any person skilled in the art. Median filter is also well-known technique.

The operation of smoothing is to smooth the edge of the character image. Any algorithm having smoothing effect may be adopted. As examples, one may cite median filter or mean filter, using templates of different sizes and different shapes. To further improve the effect of the invention, the inventors propose a smoothing algorithm improved on the basis of median filter using 3×3 template.

Dilation is also a common algorithm well known in the prior art, and the effect thereof is strong or soft depending on the size and shape of template, such as 2×2 template, 2×3 template, 3×2 template or 3×3 template and so on and so forth. In the present invention, for obtaining the optimal effect, a dilation algorithm using 2×2 template may be used as the soft dilation, and a dilation algorithm using 3×3 template may be used as the strong dilation.

For obtaining better noise-reducing effect, above-said noise filtering techniques may be combined with each other depending on the properties of the line image or the properties of the inter-line image.

In the present invention, during reducing noises, proper noise-reducing methods are adopted depending on the inter-line noise density, and/or black pixel density, and/or connected component density.

Specifically, the inventors provide three alternative embodiments of this line noise-reducing step:

A: First, removing single pixels in the line image; then smoothing the line image if inter-line noise density>=N1. Here, the threshold N1 is 0.5-1.5, preferably 1.

B: If inter-line noise density is larger than zero but not larger than N1, then removing single pixels; if inter-line noise density>N1, then processing the line image using a median filter. Here the threshold N1 is 3-7, preferably 5. This solution implies that, if inter-line noise density=0, then line noise reduction is unnecessary. This corresponds to, for example, the case of a normal document image, such as a perfect binary image (that is, non-half-tone image).

C: In a preferred embodiment of this step, noise reduction is carried out according to the conditions shown in Table 1. That is, if the conditions at the left side are met, then the corresponding operation at the right side will be carried out. For example, if black pixel density<=N1 and B8<=N4, then no operation will be carried out and the line image is directly output as the result. The last row of Table 1 means that under the conditions not shown in Table 1, removing single pixels in the line image.

Please note that in Table 1, and in subsequent table showing the conditions and corresponding operations, different rows represent different conditions and corresponding operations. The "CONDITIONS" column represent the conditions to be met, the "OPERATIONS" column represent corresponding operations to be carried out. In a same condition line, all the conditions in different cells shall be met. For example, in Table 1, only when "black pixel density>N1" and "number of inter-line noises>0" and "(inter-line noise density>=N4 or B8<=N6) and (black pixel density>=N7 or B8<=N8)", will the "smoothing" operation be done.

TABLE 1

| CONDITIONS | | | OPERATIONS |
|---|---|---|---|
| Black pixel density > N1 | Number of inter-line noises > 0 | (inter-line noise density >= N5 or B8 <= N6) and (black pixel density >= N7 or B8 <= N8) | Smoothing |
| | Number of inter-line noises = 0 | W4 >= N2 and B8 >= N3 | None |
| Black pixel density <= N1, and B8 <= N4 | | | None |
| The others | | | Removing single pixels |

Here, the thresholds N1 to N8 may be the values shown in Table 2:

TABLE 2

| Thresholds | N1 | N2 | N3 | N4 | N5 | N6 | N7 | N8 |
|---|---|---|---|---|---|---|---|---|
| Value ranges | 9-15 | 20-30 | 20-30 | 45-55 | 0.5-1.5 | 15-25 | 15-25 | 130-170 |
| Preferred values | 12 | 25 | 25 | 50 | 1 | 20 | 19 | 150 |

As described in the "Background of the Invention", depending on the macro visual appearance, document images (or line images, or character images) may be sorted into four types: broken-stroke, hollow-stroke, zigzag-stroke and noisy. In the real half-tone document images these four properties and their combination are quite normal.

The afore-described steps have reduced the noises in the line image, despite which type the line image is. The subsequent steps will focus on enhancing broken-stroke line image, hollow-stroke line image and zigzag-stroke line image. Through experiments, the inventor found out the zigzag-stroke line image is closest to the normal line image. Therefore, the term "normal line image" is used to include the zigzag-stroke line image.

In the prior arts, it is hard to enhance or recognize half-tone document image because the defects there in are not all noises, and the conventional machine (or algorithm) cannot distinguish said three types of image (consequently, so far, no techniques try to sort the document image into said three types, needless to say to process them differently), although the human eye can distinguish them very easily.

Through a great number of times of experiments, the inventors found out that the connected component density may be used to characterize different image types. (Also, please note that all the thresholds in the present disclosure are obtained through experiments.).

So, for sorting the noise-reduced line image, we need label the connected components in the noise-reduced line image 714 and obtain corresponding connected component density (ies). That is labeling step 716. This step is similar to the labeling operation as described in the portion "Pre-analyzing of line image", so its detailed description is omitted here. As will be described below, the normal line image enhancing step 720, broken-stroke line image enhancing step 722 and the hollow-stroke line image enhancing step 724 might also use the labeling result of the labeling step 716. In this step we may get B4, B8, W4 and W8. However, please note that to a person skilled in the art, it is obvious that this labeling step 716 may be distributed into subsequent steps. That is, the values of B4, B8, W4 and W8 may be calculated in concerned subsequent steps needing them, rather than be calculated in advance.

Also please note that for subsequent sorting step 718 and line enhancing steps thereafter as will be described below, the inventors propose various embodiments, among which some will not use certain connected component density(ies) as described above. If this is the case, then obviously, said certain connected component density(ies) need not be calculated in this step and the corresponding connected component(s) need not be labeled.

Based on the labeling result of the labeling step 716, we sort the line image into three types as described above in a sorting step 718.

In a first embodiment of the sorting step, we use the criteria shown in Table 3. For example, if W8<=T1 and B8>=T2, the line image is a broken-stroke line image.

TABLE 3

| Connected component density | W8 | B8 |
|---|---|---|
| Broken-stroke line image | <=T1 | >=T2 |
| Hollow-stroke line image | >T1 | any |
| Normal line image (including zigzag-stroke line image) | <=T1 | <T2 |

Here, the threshold T1 is 2-4, preferably 3; and the threshold T2 is 3-5, preferably 4.

In above Table 3, the values of W8 and B8 are used as sorting criteria. Obviously, the values of W4 and B4 may also be used as sorting criteria. In fact, any combination of W4, B4, W8 and B8 may be used as sorting criteria, and the corresponding threshold values may be obtained through experiments.

The sorting step 716 will generate three kinds of result. If the line image is a normal line image, then a normal line image-enhancing step 720 will follow; if a broken-stroke line image, then a broken-stroke line image-enhancing step 722; if a hollow-stroke line image, then a hollow-stroke line image-enhancing step 724. The three steps will be described below.

(Normal Line Image Enhancement)

For normal line image, maybe there are some zigzag strokes, so the purpose in the normal line image enhancing step 720 is to smooth the possible zigzag strokes.

In the present invention, the normal line image is enhanced by smoothing the normal line image depending on the connected component density, and/or character height, and/or the fact that whether the normal line image has ever been smoothed.

Specifically, the inventors prefer the following three embodiments of the step, although other embodiments are conceivable through reading the present disclosure:

A: First, smoothing the line image. Then, if DPI<=300, processing the line image with a median filter. The median filter may use a 3×3 template.

DPI (dots per inch) is the resolution of the scanned image, and may be read from the image to be processed. Generally, a normal line image having higher DPI will have fewer zigzags and have less influence on the recognition ratio. Therefore, it is unnecessary to smooth a normal line image with high DPI.

B: If DPI>300 or W4>=N1, then smoothing the line image. Here, the threshold N1 is 2-4, preferably 3.

C: If DPI>300 and the line image has never been smoothed in the line noise reducing step 712, or if DPI<=300 but W4>=N1 and character height>=N2, smoothing the line image. Here the threshold N1 is 1.5-2.5, preferably 2; the threshold N2 is 25-40, preferably 30.

Here, character height is just the height of a concerned horizontal line image, or the width of a concerned vertical line image.

(Broken-Stroke Line Image Enhancement)

For broken-stroke line image, the purpose of the broken-stroke line image-enhancing step 722 is to connect the broken strokes.

The core of enhancing the broken-stroke line image is dilation of the line image. If necessary, smoothing operations may be adopted.

Specifically, the inventors prefer the following three embodiments of the step, although other embodiments are conceivable through reading the present disclosure:

A: First, carrying out strong dilation on the line image, then processing the resulted line image with a median filter, which may use a 3×3 template.

B: If W4<N1, carrying out soft dilation on the line image. If W4>=N1, smoothing the line image first, then re-labeling the resulted line image and obtaining a new value of B8, if B8>N2, carrying out strong dilation on the resulted smoothed line image. Here the threshold N1 is 3-7, preferable 5, and the threshold N2 is 2-6, preferably 4.

Please note that in this embodiment of broken-stroke line image enhancing step 722, there is a re-labeling operation, which is similar to the labeling step 716 and thus the detail description thereof is omitted here.

C: In a preferred embodiment of the broken-stroke line image-enhancing step 722, we carry out operations as shown in Table 4. That is, when W4<N1, strong dilation or soft dilation is carried out depending on the value of character height to complete the enhancement.

When W4>=1, depending on the condition shown in Table 4, smoothing the line image or not. If the line image is smoothed in this step, then re-labeling the resulted smoothed line image and obtaining a new B8. Then, for the line image, of which W4>=1, judging whether B8>=N5. If B8>=N5, then carrying out strong dilation on the line image, despite whether it has been smoothed in this step or in the line noise reducing step 712.

Also, please note that in this embodiment of the broken-stroke line image-enhancing step 722, there is a re-labeling operation, which is similar to the labeling step 716 and thus the detail description thereof is omitted here.

TABLE 4

| CONDITIONS | | OPERATIONS | |
|---|---|---|---|
| W4 < N1 | Character height >= N2 | Strong dilation | |
| | Character height < N2 | Soft dilation | |
| W4 >= N1 | W4 < N3 and black pixel density > N4, and the line image has never been smoothed in the line noise reducing step 712 | Smoothing, then re-labeling | if B8 >= N5, strong dilation |
| | Else | None | |

The values of the thresholds N1 to N5 are shown in Table 5:

TABLE 5

| Thresholds | N1 | N2 | N3 | N4 | N5 |
|---|---|---|---|---|---|
| Value ranges | 9-15 | 30-60 | 15-30 | 8-15 | 3-5 |
| Preferred values | 10 | 45 | 20 | 12 | 4 |

(Hollow-Stroke Line Image Enhancement)

For hollow-stroke line image, the purpose of the hollow-stroke line image-enhancing step 724 is to fill the hollow areas in the strokes.

In the present invention, the hollow-stroke line image is enhanced by smoothing the line image and then dilating the resulted line image.

Specifically, the inventors prefer the following three embodiments of the step, although other embodiments are conceivable through reading the present disclosure:

A: First, processing the line image with a median filter, which can use a 3×3 template. Then, if W4>N1, a strong dilation is carried out on the resulted line image. Here, the threshold N1 is 40-80, preferably 60. Here, the value of W4 is the value obtained in the labeling step 716; but it may also be re-labeled after the processing with the median filter. If it is re-labeled, the range and the preferred value of the threshold will vary and may be obtained through experiments by a person skilled in the art without inventive labor.

B: First, smoothing the line image. Then, if W4>N1, carrying out a strong dilation on the resulted line image. Here, the threshold N1 is 40-80, preferably 60. Here, similarly the value of W4 is the value obtained in the labeling step 716; but it may also be re-labeled after the processing with the median filter. If it is re-labeled, the range and the preferred value of the threshold will vary and may be obtained through experiments by a person skilled in the art without inventive labor.

C: If the line image has been smoothed in the line noise reducing image, and if B8>=N9, then a strong dilation is carried out on the line image. If the line image has never been smoothed in the line noise-reducing image, then we subject the line image to a first processing step, a re-labeling step and a second processing step.

The first processing step consists of the operations shown in Table 6:

TABLE 6

| CONDITIONS | | OPERATIONS |
|---|---|---|
| Black pixel density <= N1 | | Strong dilation |
| Black pixel density > N1 | B8 < N2 and B4 < N4 | Smoothing |
| | B8 > N3 | Smoothing |
| | N2 <= B8 <= N3 | Removing single pixels, then strong dilation |

The re-labeling step is similar to the labeling step 716 and thus the detail description thereof is omitted here. By re-labeling the line image resulted from the first processing step, new values of W4, W8 and B4, B8 are obtained.

The second processing step consists of the following operations: if B8>=N5 and W4>=N8, carrying out a strong dilation on the line image resulted from the first processing step; if B8<N5 and W8>N6 and W4>N7, carrying out a soft dilation on the line image resulted from the first processing step.

Here the thresholds N1 to N9 may be the values shown in Table 7:

TABLE 7

| Thresholds | N1 | N2 | N3 | N4 | N5 | N6 | N7 | N8 | N9 |
|---|---|---|---|---|---|---|---|---|---|
| Value ranges | 9-15 | 3-5 | 20-40 | 80-120 | 4-8 | 10-20 | 50-70 | 40-60 | 3-5 |
| Preferred values | 12 | 4 | 30 | 100 | 6 | 15 | 60 | 60 | 4 |

After the normal line image enhancing step 720, the broken-stroke line image enhancing step 722 or the hollow-stroke line image-enhancing step 724, we obtain enhanced line image. All the enhanced line images, together with the inter-line images obtained in the block noise-reducing step 704, constitute an enhanced block image.

Above, the steps of the preferred embodiment of the inventive document image enhancing method have been described in detail. Almost for each step, more than one embodiments of that step have been given out. Obviously, different embodiments of different steps may be combined in any manner, and thus the preferred embodiment of the inventive method actually includes a plurality of variants.

(A Variant of the Preferred Embodiment)

The above-described preferred embodiment aims to enhance block image that has been segmented from the original document image. However, the inventive may also include a block segmentation step 104 as shown in FIG. 7A so as to be capable of enhance directly the original document image input from scanning means such as of a copying apparatus.

FIGS. 8A and 8B to FIGS. 11A and 11B illustrate the effects of the present invention. FIGS. 8A, 9A, 10A and 11A show image samples respectively having background noises, broken strokes, hollow strokes and zigzag strokes. FIGS. 8B, 9B, 10B and 11B are corresponding enhanced images. It could be seen that the visual appearance of the images are greatly improved. So, the invention may be used for general purposes, as well as in copying apparatus.

Character Recognition Method

The invention also provides a character recognition method using the inventive document image enhancing method.

Figure 7B:
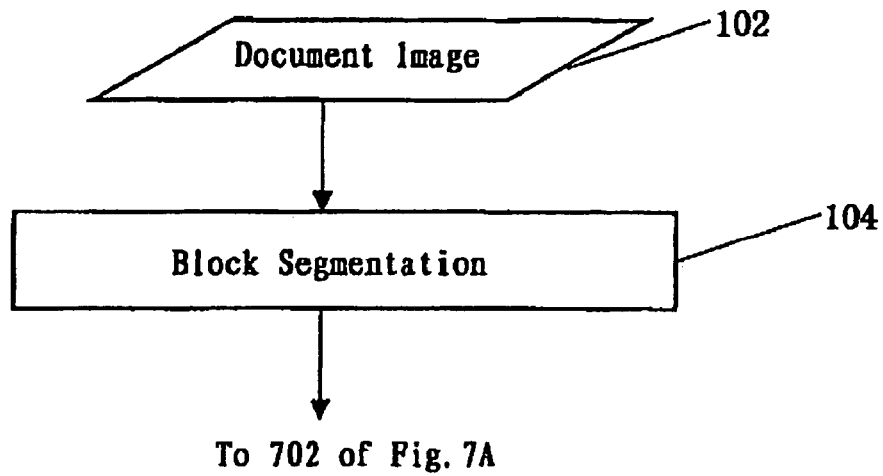
FIG. 7B is a variant of the embodiment shown in FIG. 7A.
Figure 7C:
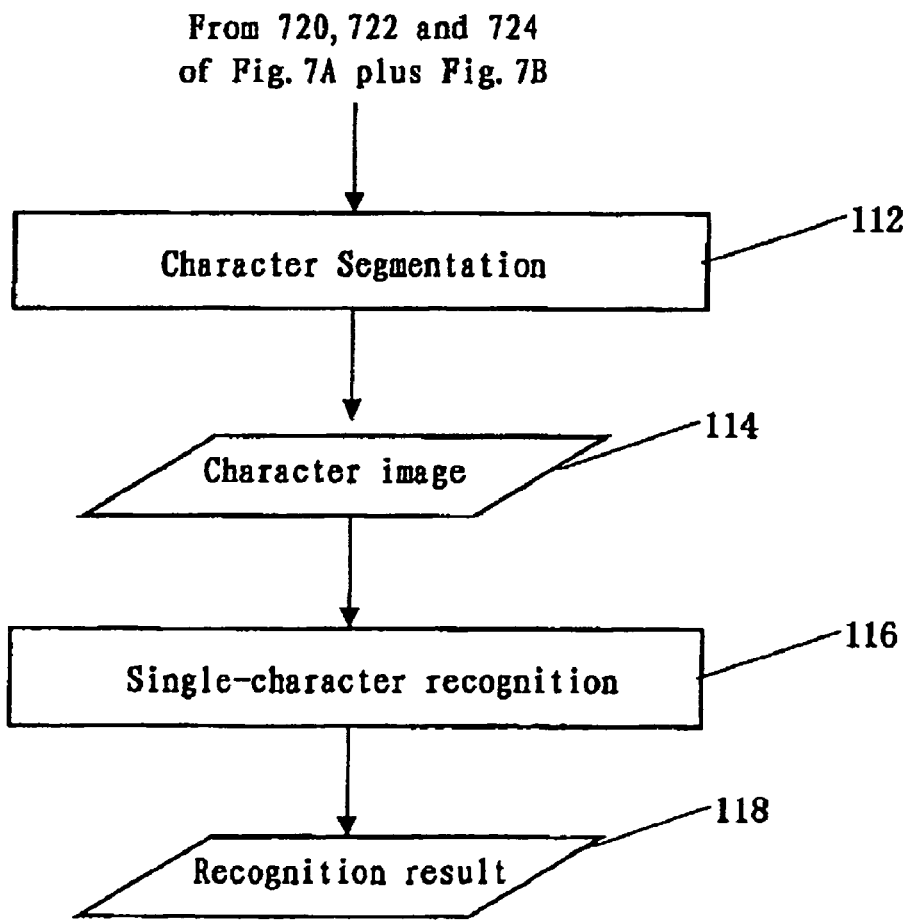
FIG. 7C is a flow chart of a preferred embodiment of a character recognition method according to the invention.

FIG. 7C shows an embodiment of the inventive character recognition method. In addition to the steps shown in FIG. 7A and 7B, the method further include a character segmentation step 112 and a single-character recognition step 116, both of which are known techniques.

Applying the invention may improve greatly the recognition ratio of document image, especially half-tone document image. The inventors evaluated the invention through recognizing some samples with and without the inventive enhancing method. The results are shown in FIGS. 12 and 13.

The half-tone document images for evaluation are copied from magazines, printed paper, books and a little newspaper using "Canon ImageRunner 2800" and the images are sorted with the properties as we defined. The file format of the half-tone document image is "TIFF", the DPI including 300, 400 and 600. The total amount of characters is 71244, among which: noisy, 23339; broken-stroke: 13961; hollow-stroke: 17689; zigzag-stroke: 16255.

Figure 12:
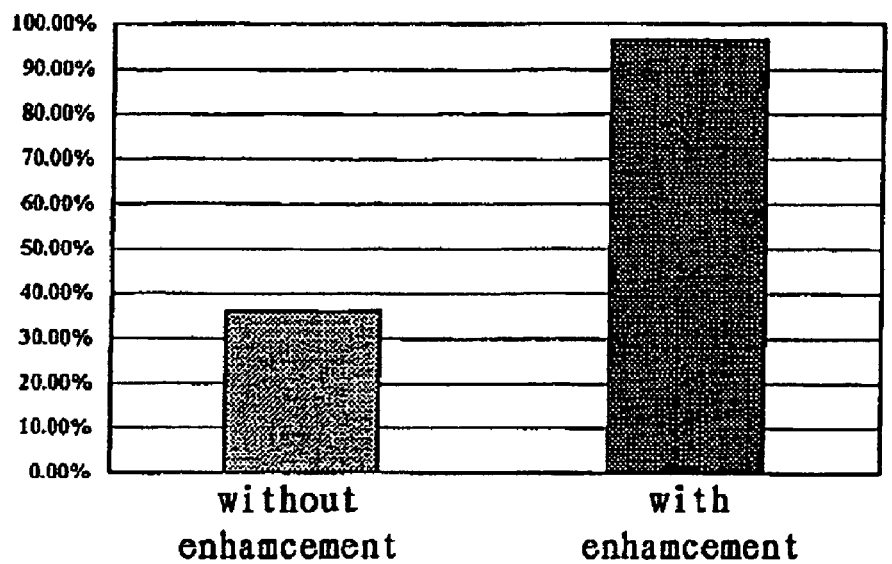
FIG. 12 is a histogram showing the performance of an OCR engine using the invention.
Figure 13:
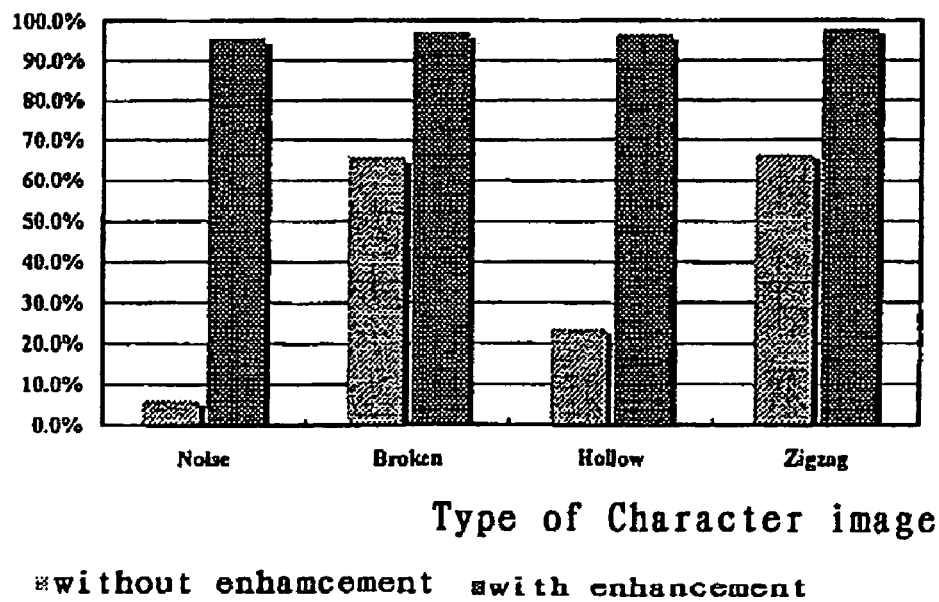
FIG. 13 is another histogram showing the performance of an OCR engine using the invention.

As shown in FIG. 12, the overall recognition ratio is improved greatly after using the inventive enhancement. FIG. 13 shows the respective ratios of different types with and without enhancement.

The invention further provides a document image enhancing apparatus and a character recognition apparatus, which will be described in details in the following text. Similar to the method described above, any one of the components constituting the document image enhancing apparatus and the character recognition apparatus of the invention may be a component or a combination of components of any information processing equipment as described above, or a combination of software and/or hardware and/or firmware installed on or incorporated in any information processing equipment as described above. For a person skilled in the art, it would be easy to realize the components of the invented apparatuses. Also, it is obvious to a person skilled in the art that the functioning of each of the components may involve the use of I/O device, memory device, microprocessor such as CPU, and the like. The following descriptions of the apparatuses of the invention will not necessarily mention such devices, although they are actually used. For example, the original image and every intermediate processing result are undoubtedly stored somewhere, either temporarily or permanently until the process is completed. As a specific example of the information processing equipment, a computer system has been described above and its description is omitted here.

Document Image Enhancing Apparatus (Preferred Embodiment)

Figure 14:
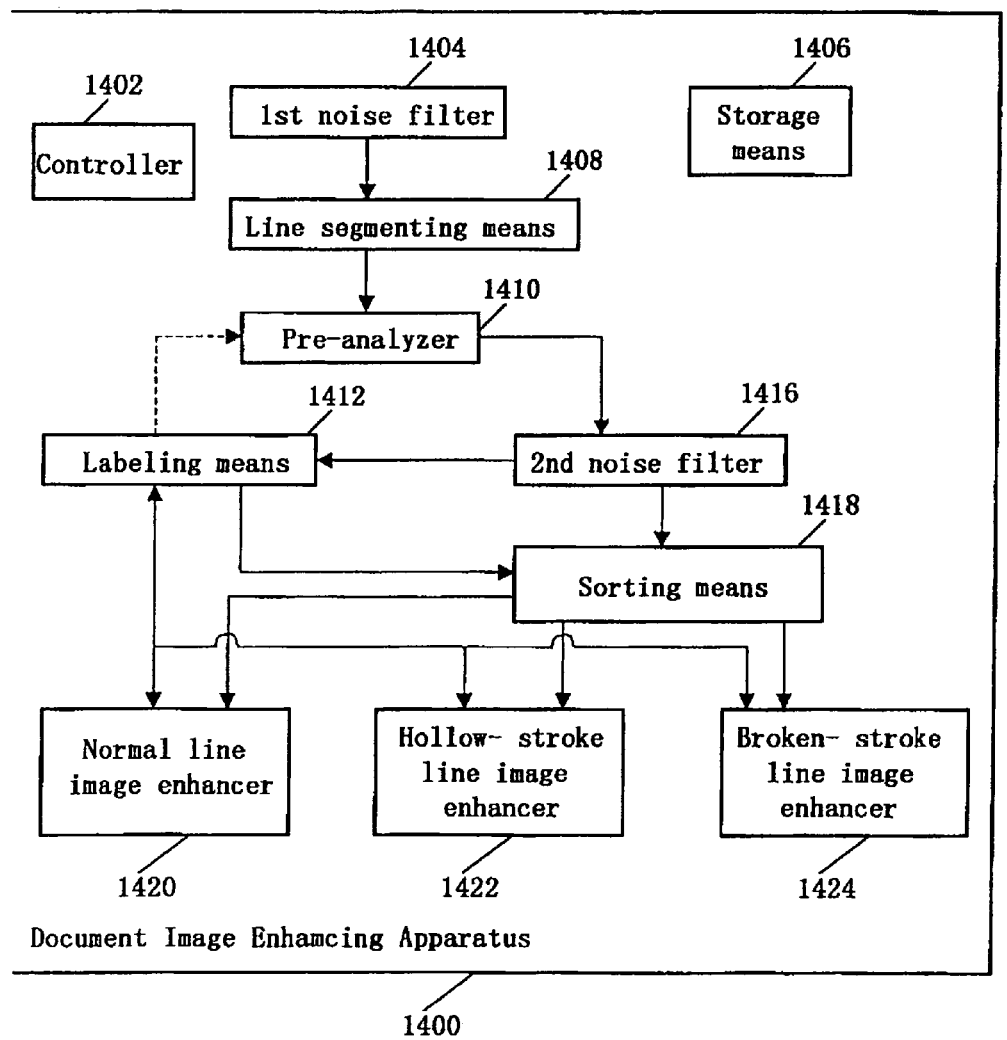
FIG. 14 shows a block diagram of a preferred embodiment of a document image enhancing apparatus according to the invention.

FIG. 14 shows a preferred embodiment of the document image enhancing apparatus 1400, the components of which will be described below.

A storage means 1406 is configured for storing the original block image to be enhanced, intermediate and final images, and other intermediate results such as the properties of the line images or inter-line images as described below.

A first noise filter 1404 is configured for reducing noises in the original block image, resulting in a noise-reduced block image. The first noise filter 1404 may be any filter as described above in connection with the document image enhancing method. In particular, it may be a median filter or a mean filter. A median filter using a 3×3 template is preferable.

A line segmenting means 1408 is configured to segment the noise-reduced block image and generates position information of line images. The line segmenting means belongs to known techniques.

Figure 15:
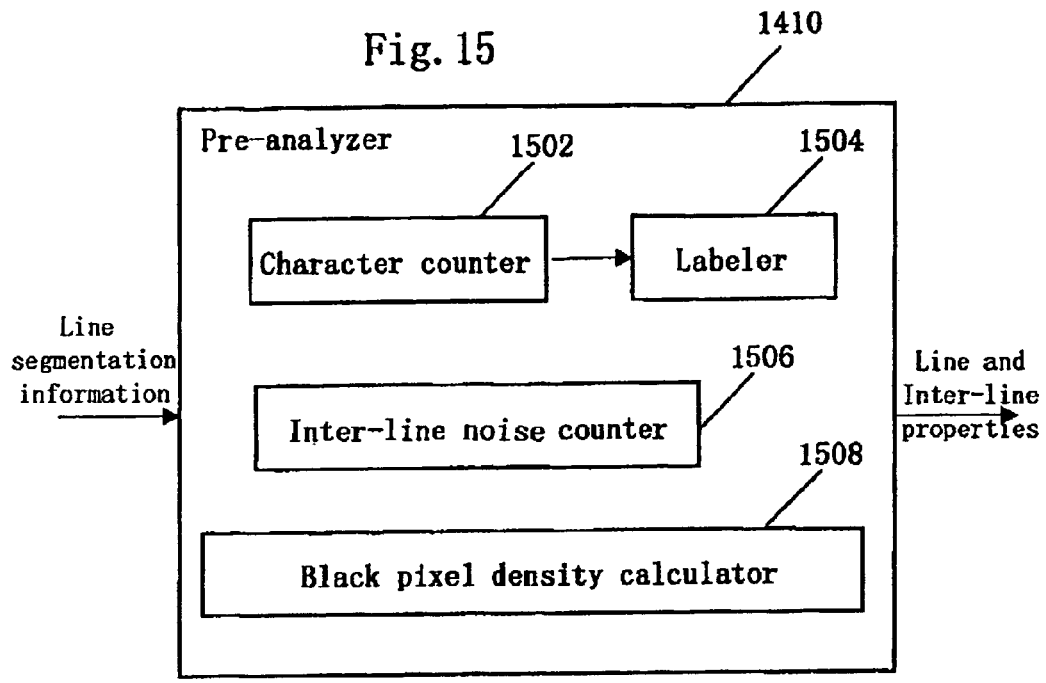
FIG. 15 shows a block diagram of the pre-analyzer shown in FIG. 14.

A pre-analyzer 1410 is configured to analyze the line images and the inter-line images in the original block image, generating properties of the line images and the inter-line images. As described above, these properties may include character number in each line image, the number of inter-line noises, inter-line noise densities, black pixel density in each line image and connected component densities (which may include W4, W8, B4 or B8). Correspondingly, the pre-analyzer 1410 may, as shown in FIG. 15, include a character counter 1502 configured to calculate the number of characters in each line image as described afore, a labeler 1504 configured to label the connected components in each line image and calculate the corresponding connected component density based on the number of the connected components and the character number obtained from the character counter 1502, an inter-line noise counter 1506 configured to count the number of noises in the inter-line image as described afore and calculate the inter-line noise density as described afore, and a black pixel density calculator 1508 configured to calculate the density of black pixels in each line image. Here, the labeler 1504 in the pre-analyzer 1410 may be omitted and the pre-analyzer 1410 may use the labeling means 1412 as will be described below.

A second noise filter 1416 is configured to reduce noises in the line images in the original block image based upon the properties as mentioned above, resulting in noise-reduced line images. The specific manner of the noise-reducing operation has been described in the portion "Document Image Enhancing Method".

A labeling means 1412 is configured to label connected components in an image and generate densities of different connected components in the image, and used to label the noise-reduced line image obtained from the second noise filter and, if necessary, other intermediate line images, such as generated in the normal line image enhancer 1420, the hollow-stroke line image enhancer 1422 and the broken-stroke line image enhancer 1424. The labeling means 1412 is substantially the same as the labeler 1504 of the pre-analyzer 1410 as mentioned above, and they may be integrated into one.

A sorting means 1418 is configured to, according to the connected component density obtained from the labeling means 1412, sort the noise-reduced line images into three types including normal line image, broken-stroke line image and hollow-stroke line image. The specific sorting manner has been described afore.

A normal line image enhancer 1420 is configured to enhance the normal line image, based on above-said properties, through smoothing the line image. A hollow-stroke line image enhancer 1422 is configured for enhancing the hollow stroke line image, based on said properties, through filling the hollow areas in the strokes in the line image. A broken-stroke line image enhancer is configured for enhancing the broken-stroke line image, based on said properties, through connecting the broken-stroke in the line image. The specific operations of the enhancers have been described afore in the portion "Document Image Enhancing Method".

It is possible that the operations of the normal line image enhancer 1420, the hollow-stroke line image enhancer 1422 and the broken-stroke line image enhancer 1424 need use the connected component density(ies) generated in the labeling means 1412. And, as described afore, the enhancers may have their intermediate result re-labeled by the labeling means and use the re-labeling results to further enhance the line image.

The document image enhancing apparatus further includes a controller configured to control the operations of above components and ensuring that each line image is processed.

(A Variant of the Preferred Embodiment)

The above-described preferred embodiment aims to enhance block image that has been segmented from the original document image. However, the inventive apparatus may also include a block segmenting means (not shown) so as to be capable of enhance directly the original document image input from scanning means such as of a copying apparatus.

Character Recognition Apparatus

Figure 16:
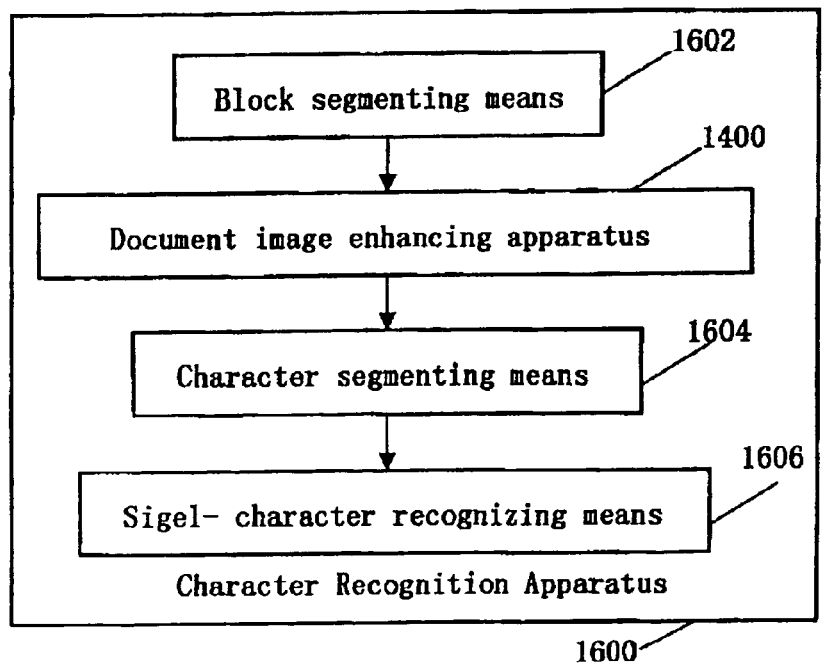
FIG. 16 shows a block diagram of a character recognition apparatus according to the invention.

The invention further provides a character recognition apparatus 1600 (FIG. 16) comprising block segmenting means 1602 configured to segment the original document image to obtain a block image, above-said document image enhancing apparatus 1400, character segmenting means 1604 configured to segment the line images in the enhanced block image into single-character images, and single-character recognizing means 1606 configured to recognize each single-character image. The block segmenting means 1602, character segmenting means 1604 and the single-character recognizing means 1606 are all prior arts.

Storage Medium

The objects of the invention may also be realized through running a program or a set of programs on any information processing equipment as described above, which may be communicated with said image source and subsequent processing apparatus. Said information processing equipment, image source and subsequent processing apparatus are all well-known universal equipments. Therefore, the objects of the invention may be realized by merely providing program codes, which can implement said document image enhancing method or character recognition method. That is to say, a storage medium storing program codes for implementing said document image enhancing method or character recognition method constitutes the invention.

For a person skilled in the art, it would have been easy to program said document image enhancing method or character recognition method using any program language. Therefore, a detailed description of the program codes is omitted.

And obviously, said storage medium may be any type known by a person skilled in the art or developed in the future, so it is unnecessary to enumerate various storage media herein.

While the invention has been described with reference to specific steps and structures disclosed herein, it is not confined to the details set forth and this application is intended to cover all the changes, modifications and variations which are not far away from the spirit and the scope of the invention. For example, as to the document image enhancing apparatus and character recognition apparatus described above, the different components may be realized separately, or some of them may be integrated together, for example, various memories including that for storing the document image may be physically one memory. It is also possible that the functions of any component may be distributed into more than one component. Furthermore, the inventive document image enhancing method and apparatus can not only applied in character recognition, but also can be applied in image enhancement for various purposes, such as in copying apparatus. Furthermore, the evaluation results of and the thresholds values used in the present invention are obtained through applying the invention on document images in Chinese. After reading the present disclosure, a person skilled in the art will easily apply the invention on document images in any language, with the threshold values slightly modified through normal experiments. Therefore, undoubtedly, the scope of protection of the invention covers enhancing and recognizing of document images in any language.

The invention claimed is:

1. A document image enhancing method comprising using a processor to perform the steps of:
reducing noises in an original block image, resulting in a noise-reduced block image;
segmenting the noise-reduced block image and obtaining position information of line images;
obtaining properties of line images and inter-line images by pre-analyzing the line images and the inter-line images in the original block image;
reducing noises in the line images in the original block image based upon said properties, resulting in noise-reduced line images;
labeling connected components in the noise-reduced line images and obtaining densities of the connected components in the noise-reduced line images;
based on the densities of the connected components, sorting the noise-reduced line images into three types including normal line image, broken-stroke line image and hollow-stroke line image; and
enhancing the noise-reduced line images based on their types and said properties, whereby enhanced line images are obtained.

2. The document image enhancing method according to claim 1, characterized in that said properties include at least one of the following:
connected component densities, equal to the number of connected components in a line image divided by the number of characters in the line image, and including at least one of black 8 connected component density, black 4 connected component density, white 8 connected component density and white 4 connected component density;
black pixel density equal to the number of black pixels in a line image divided by the area in pixels of the line image;
the number of inter-line noises in predetermined regions selected from the inter-line images above and below a concerned line image;
inter-line noise density equal to said number of inter-line noises divided by the area of said regions;
character height, equal to the height of the concerned line image; and DPI, read from the original block image.

3. The document image enhancing method according to claim 2, characterized in that the step of reducing noises in the line images comprises reducing noises in the line images according to the inter-line noise density and/or black pixel density and/or connected component density.

4. The document image enhancing method according to claim 1, characterized in that the connected component density in the noise-reduced line image equals the number of connected components in the noise-reduced line image divided by the number of characters in the line image, and includes at least one of black 8 connected component density, black 4 connected component density, white 8 connected component density and white 4 connected component density.

5. The document image enhancing method according to claim 4, characterized in that, in the sorting step, the sorting criteria is:
if white 8 connected component density<=T1 and black 8 connected component density<=T2, then the line image is a broken-stroke line image;
if white 8 connected component density<T1, then the line image is a hollow-stroke line image; and
if white 8 connected component density<=T1 and black 8 connected component density<T2, then the line image is a normal line image, wherein the threshold T1 is between 2 and 4, and the threshold T2 is between 3 and 5.

6. The document image enhancing method according to claim 5, characterized in that T1 is 3 and T2 is 4.

7. The document image enhancing method according to claim 1, characterized in that the enhancing step:
enhances the normal line image by smoothing it;
enhances the hollow-stroke line image by filling the hollow areas in the strokes thereof; and
enhances the broken-stroke line image by connecting the broken strokes therein.

8. The document image enhancing method according to claim 7, characterized in that the step of enhancing the normal line image further comprises smoothing the normal line image according to at least one of the connected component density, character height and whether the normal line image has ever been smoothed.

9. The document image enhancing method according to claim 7, characterized in that the step of enhancing the broken-stroke line image comprises the steps of:
carrying out strong dilation on the broken-stroke line image; and
processing the resulted line image with a median filter.

10. The document image enhancing method according to claim 7, characterized in that the step of enhancing the broken-stroke line image further comprises a step of carrying out strong dilation on the line image or a step of soft dilation on the line image depending on at least one of the connected component density and character height.

11. The document image enhancing method according to claim 10, characterized in that the step of carrying out strong dilation on the line image further comprises a smoothing step and a step of carrying out strong dilation on the line image depending on the connected component density of the smoothed line image.

12. The document image enhancing method according to claim 11, characterized in that the smoothing step comprises smoothing the line image depending on the connected component density and whether the line image has ever been smoothed before.

13. The document image enhancing method according to claim 7, characterized in that the step of enhancing the hollow-stroke line image further comprises a step of smoothing the line image and a step of dilating the resulted line image.

14. The document image enhancing method according claim 13, characterized in that the step of dilating the line image further comprises a step of determining whether to carry dilation on the line image depending on the connected component density, or a step of determining whether to carry out a strong dilation or a soft dilation on the line image depending on the connected component density.

15. The document image enhancing method according to claim 13, characterized in that the step of smoothing the line image further comprises a step of determining whether to smooth the line image depending on the connected component density and whether the line image has ever been smoothed or a step of determining the smoothing method according to the connected component density.

16. A character recognition method comprising using a processor to perform the steps of:
segmenting an original document image to obtain an original block image;
reducing noises in the original block image, resulting in a noise-reduced block image;
segmenting the noise-reduced block image and obtaining position information of line images;

obtaining properties of line images and inter-line images by pre-analyzing the line images and the inter-line images in the original block image;

reducing noises in the line images in the original block image based upon said properties, resulting in noise-reduced line images;

labeling connected components in the noise-reduced line images and obtaining the densities of the connected components in the noise-reduced line images;

based on the densities of the connected components, sorting the noise-reduced line images into three types including normal line image, broken-stroke line image and hollow-stroke line image;

enhancing the noise-reduced line images based on their types and said properties, whereby enhanced line images are obtained;

segmenting the enhanced line images into single-character images; and recognizing the single-character images.

17. A document image enhancing apparatus comprising:

storage means configured for storing the original block image to be enhanced, intermediate and final images, and other intermediate results;

a first noise filter configured for reducing noises in the original block image, resulting in a noise-reduced block image;

a line segmenting means configured for segmenting the noise-reduced block image and generating position information of line images;

generating properties of line images and inter-line images by a pre-analyzing means configured for pre-analyzing the line images and the inter-line images in the original block image;

a second noise filter configured for reducing noises in the line images in the original block image based upon said properties, resulting in noise-reduced line images;

a labeling means configured for labeling connected components in the noise-reduced line image and obtaining densities of the connected components in the noise-reduced line image;

a sorting means configured for sorting the noise-reduced line images into three types including normal line image, broken-stroke line image and hollow-stroke line image based on the densities of the connected components;

a normal line image enhancer configured for enhancing the normal line image, based on above-said properties, through smoothing the line image;

a hollow-stroke line image enhancer configured for enhancing the hollow-stroke line image, based on said properties, through filling the hollow areas in the strokes in the line image;

a broken-stroke line image enhancer configured for enhancing the broken-stroke line image, based on said properties, through connecting the broken stroke in the line image; and a controller configured for controlling the operations of the above components and ensuring that each line image is processed.

18. The document image enhancing apparatus according to claim 17, characterized in that said pre-analyzer includes at least one of:

a character counter configured for calculating the number of characters in each line image;

a labeler configured for labeling the connected components in each line image and calculating the corresponding connected component density based on the number of connected components and the character number obtained from the character counter;

an inter-line noise counter configured for counting the number of noises in predetermined regions in the inter-line image and calculating the inter-line noise density in said predetermined regions; and a black pixel density calculator configured for calculating the density of black pixels in each line image.

19. The document image enhancing apparatus according to claim 18, characterized in that said labeling means and said labeler in the pre-analyzer are integrated into one.

20. The document image enhancing apparatus according to claim 17, characterized in that said labeling means are further configured to re-label the intermediate results of the normal line image enhancer, the hollow-stroke line image enhancer or the broken-stroke line image enhancer, and the enhancers use the re-labeling results to further enhance the line images.

21. A character recognition apparatus comprising the document image enhancing apparatus according to claim 17, and further comprising block segmenting means configured for segmenting an original document image to obtain said block image, character segmenting means configured for segmenting the line images into single-character images, and single-character recognizing means configured for recognizing each single-character image.

22. A document image enhancing method comprising using a processor to perform the steps of:

obtaining black 8 connected component density and white 8 connected component density in an image;

sorting the image into three types including normal line image, broken-stroke line image and hollow-stroke line image, based on the black 8 connected component density and the white 8 connected component density; and enhancing the image according to the sorted type.

23. The document image enhancing method according to claim 22, characterized in that, in the enhancing step:

the normal line image is enhanced by smoothing it;

the hollow-stroke line image is enhanced by filling the hollow areas in the strokes thereof; and the broken-stroke line image is enhanced by connecting the broken strokes therein.

24. The document image enhancing method according to claim 23, characterized in that the step of enhancing the broken-stroke line image comprises the steps of:

carrying out strong dilation on the broken-stroke line image; and processing the resulted line image with a median filter.

25. The document image enhancing method according to claim 23, characterized in that the step of enhancing the broken-stroke line image further comprises a step of carrying out strong dilation on the line image or a step of soft dilation on the line image depending on the labeling result.

26. The document image enhancing method according to claim 23, characterized in that the step of enhancing the hollow-stroke line image further comprises a step of smoothing the line image and a step of dilating the resulted line image.

27. A computer-readable storage medium storing program codes implementing the method claimed in claim 1.

28. A computer-readable storage medium storing program codes implementing the method claimed in claim 22.

* * * * *